(12) United States Patent
Szczerba et al.

(10) Patent No.: US 7,904,220 B2
(45) Date of Patent: Mar. 8, 2011

(54) VEHICULAR MULTIFUNCTION CONTROL SYSTEM

(75) Inventors: Joseph F. Szczerba, Grand Blanc, MI (US); John K. Lenneman, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1385 days.

(21) Appl. No.: 11/187,615

(22) Filed: Jul. 22, 2005

(65) Prior Publication Data

US 2006/0030982 A1    Feb. 9, 2006

Related U.S. Application Data

(60) Provisional application No. 60/591,130, filed on Jul. 26, 2004.

(51) Int. Cl.
   *G05D 1/00* (2006.01)
(52) U.S. Cl. .................. 701/36; 165/202; 701/1
(58) Field of Classification Search ............... 701/1, 36, 701/51, 60, 53, 69; 165/42, 43, 202; 60/132, 60/208; 700/276, 300
   See application file for complete search history.

(56) References Cited

U.S. PATENT DOCUMENTS

| | | | |
|---|---|---|---|
| 5,275,012 A * | 1/1994 | Dage et al. ............. | 62/208 |
| 6,032,089 A * | 2/2000 | Buckley ............. | 701/36 |
| 6,275,231 B1 | 8/2001 | Obradovich | |
| 6,373,472 B1 | 4/2002 | Palalau et al. | |
| 6,479,769 B1 * | 11/2002 | Barat et al. ............. | 200/5 R |
| 6,571,154 B2 | 5/2003 | Worrell et al. ............. | 701/1 |
| 6,686,911 B1 * | 2/2004 | Levin et al. ............. | 345/184 |
| 6,698,512 B2 * | 3/2004 | Forrest et al. ............. | 165/202 |
| 6,874,574 B2 * | 4/2005 | Forrest et al. ............. | 165/202 |
| 7,084,859 B1 | 8/2006 | Pryor | |
| 7,424,344 B2 * | 9/2008 | Mirza et al. ............. | 700/276 |
| 2003/0231163 A1 | 12/2003 | Hanon et al. | |
| 2005/0021190 A1 | 1/2005 | Worrell et al. | |
| 2006/0119570 A1 | 6/2006 | Searle et al. | |

FOREIGN PATENT DOCUMENTS

EP    1582393 A2    10/2005

OTHER PUBLICATIONS

International Search Report dated Mar. 26, 2007 for PCT/US05/26363 filed Jul. 22, 2005 and corresponding to this application.
McCullough et al., "New 12-Cylinder W12. W Stands for Wow," www.automotive.com, downloaded Jul. 21, 2005.
Brauer, "Why iDrive Won't Fly," www.edmunds.com, downloaded Jul. 21, 2005.
Bettencourt, Michael; "Acura Aims Higher", Carguidemagazine.com, Oct. 2004, 3 pages.
Office Action for U.S. Appl. No. 11/548,306 mailed Sep. 8, 2009.

* cited by examiner

*Primary Examiner* — Richard M. Camby
(74) *Attorney, Agent, or Firm* — Quinn Law Group, PLLC (57) ABSTRACT

A control system for a vehicle with a plurality of selectively variable characteristics includes a mode selector switch and a characteristic adjustment switch. Rotation of the mode selector switches causes the control system to alternate between first and second modes of operation. In the first mode of operation, rotation of the characteristic adjustment switch causes a first variable characteristic to change. In the second mode of operation, rotation of the characteristic adjustment switch causes a second variable characteristic to change. The control system thus enables a single switch to control multiple characteristics or multiple vehicle systems, which enables a corresponding reduction in the quantity of switches in a vehicle passenger compartment.

15 Claims, 5 Drawing Sheets

VEHICULAR MULTIFUNCTION CONTROL SYSTEM

CROSS REFERENCE TO RELATED APPLICATION

This application claims the benefit of U.S. Provisional Application No. 60/591,130, filed Jul. 26, 2004, and which is hereby incorporated by reference in its entirety.

TECHNICAL FIELD

This invention relates to vehicular multifunction control systems that include a plurality of switches and that are configured for a first mode of operation in which each of the switches is rotatable to alter a respective first variable characteristic, and a second mode of operation in which each of the switches is rotatable to alter a respective second variable characteristic.

BACKGROUND OF THE INVENTION

A motor vehicle typically includes a multitude of components and systems that enhance the comfort and convenience of the driver and passengers. Such systems include, for example, audio systems having a radio, speakers, compact disc player, and. cassette player; climate systems having heating, ventilation, and air conditioning. components; navigational systems; etc.

Each of the systems typically includes an interface through which the driver of the vehicle can interact with the system. For example, control of a system requires that the driver of the vehicle input command information via the interface to which the system is responsive to vary a system characteristic. Each system may also supply information to the driver via the interface. For example, an audio system will indicate the radio station to which it is tuned, a climate control system will indicate the fan speed or the thermostat setting, and a navigational system will indicate location information.

Each system typically includes, its own dedicated interface. Thus, for example, a climate control system includes a plurality of switches, buttons, dials, etc. that are operable to control only the climate control system. Similarly, an audio system includes a plurality of switches, buttons, dials, etc. that are operable only to control the audio system.

SUMMARY OF THE INVENTION

A multifunction control system is provided for a vehicle having a plurality of variable characteristics. The control system includes two switches or dials, i.e., a mode selector switch and a characteristic adjustment switch. The control system is configured such that manipulation of the mode selector switch causes, at least in part, the control system to alternate between at least two modes of operation, including a first mode and a second mode. In the first mode of operation, the characteristic adjustment switch is manipulable by a driver or passenger to alter a first variable characteristic. In the second mode, the characteristic adjustment switch is manipulable by the driver or passenger to alter a second variable characteristic.

In a preferred embodiment, the selector switch and the characteristic adjustment switch are generally cylindrical and selectively rotatable; manipulation of the switches includes at least rotating the switches.

Examples of vehicle systems include a climate system having variable characteristics such as air temperature, fan speed, and air flow mode; an audio system having variable characteristics such as radio tuner frequency, speaker volume, compact disc track playing; etc.

Thus, the characteristic adjustment switch is reconfigurable to control multiple vehicle systems and multiple variable characteristics, effectively reducing the number of input devices in a vehicle cockpit compared to the prior art. The multifunction control system of the invention thus provides increased interior styling options compared to the prior art by reducing the styling constraints imposed by a large quantity of input devices. By reducing the number of input devices in a vehicle cockpit, the multifunction control system may also improve human-vehicle interaction by enabling input devices for multiple vehicle systems to be situated in preferred locations, within easy reach of the driver.

The control system preferably further includes a display. The control system is configured such that the appearance of the screen is responsive to rotation of the mode selector switch to indicate whether the control system is in the first or second mode, or whether the control system will be in the first or second mode after an additional input by the driver. The display is also configured to depict indicia representative of the first variable characteristic when the control system is in the first mode, and to depict indicia representative of the second variable characteristic when the control system is in the second mode.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
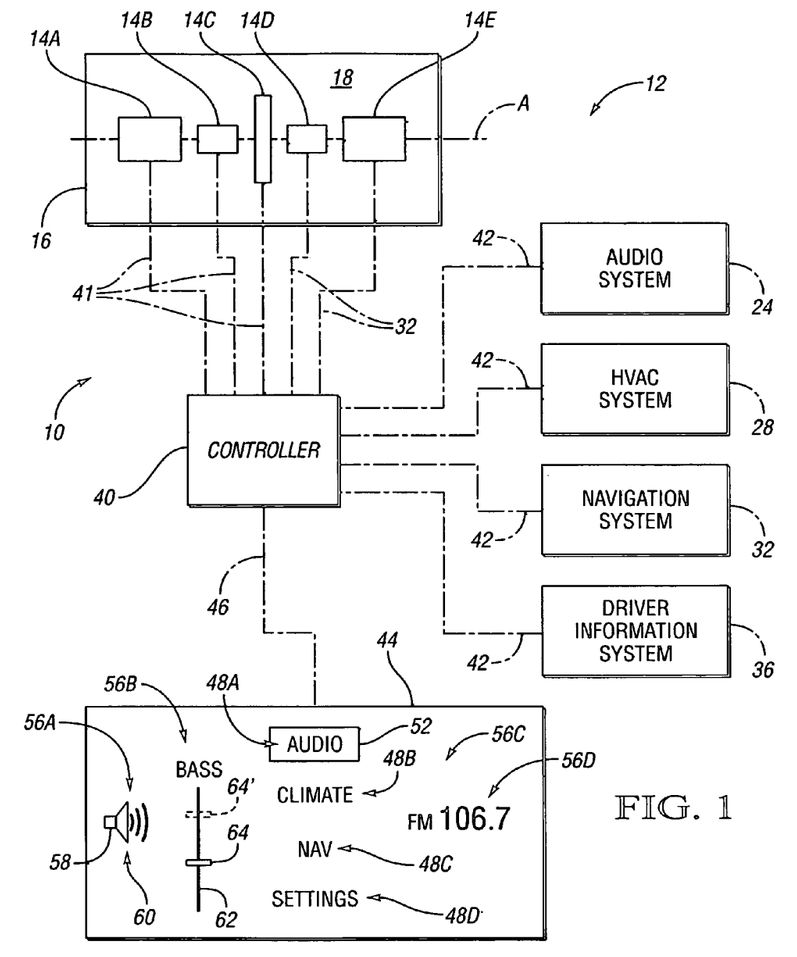
FIG. 1 is a schematic depiction of a vehicle with vehicular systems and a control system with a plurality of switches and a display for controlling the vehicular systems.

Referring to FIG. 1, a multifunction control system 10 for a vehicle 12 is schematically depicted. The control system 10 includes a plurality of generally cylindrical barrel switches 14A-E, also sometimes referred to as "rotary finger barrels"

and "rotary barrel dials." In the embodiment depicted, the switches 14A-E have a common axis of symmetry A. Switches 14A-E are generally circular in cross-section in a plane that is perpendicular to axis A. The switches 14A-E may have differing radial dimensions to provide a tactile distinguishing feature and thus facilitate a driver's ability to distinguish the switches. In an exemplary embodiment, the central switch 14C is about 50 millimeters in diameter. End switches 14A, 14E are about 30 millimeters in diameter. Switches 14B, 14D are about 20 millimeters in diameter.

Similarly, the switches. 14A-E may also have differing axial lengths, with the central switch 14C having a length of about 10 millimeters, end switches 14A, 14E having a length of about 25 millimeters, and switches 14B, 14D having a length of about 20 millimeters. Approximately 5 millimeters separates adjacent switches. The switches 14A-E are preferably located on a center console between a driver's seat and a passenger's seat, on an instrument panel, or on a steering wheel. The switches 14A-E may also include different surface textures to facilitate a driver's ability to distinguish them. For example, the switches may be coated with different materials, or have different surface features such as ridges, bumps, etc.

Figure 1A:
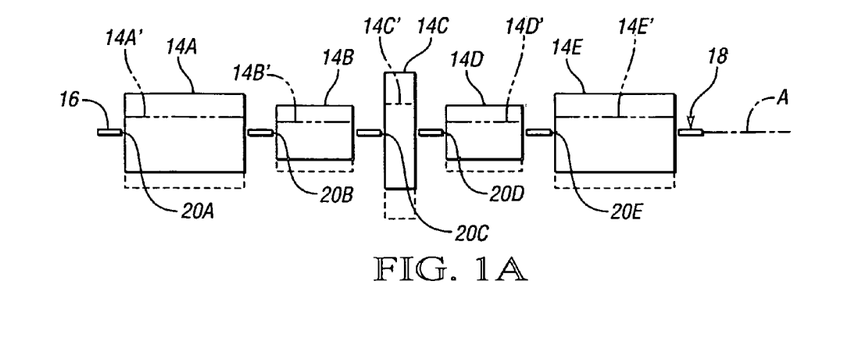
FIG. 1A is, a schematic elevational view of the switches of FIG. 1.

Referring to FIGS. 1 and 1A, a switch plate 16 defines a surface 18 that is exposed to the passenger compartment of vehicle 12. The switch plate 16 defines a plurality of apertures 20A-E. Each of switches 14A-E extends through a respective one of the apertures 20A-E such that at least a portion of each switch protrudes from surface 18 so as to be manipulable by a vehicle occupant to cause rotation about axis A. Each barrel switch is freely and independently rotatable about axis A. The switches may also be characterized by different haptic feedback characteristics, i.e., variations in resistance to rotation caused by springs, detents, feedback motors, etc. In a preferred embodiment, each switch is also selectively and independently depressible to a depressed position, shown in phantom at 14A', 14B', 14C', 14D', and 14E' in FIG. 1A. The scroll wheel sometimes found on a computer mouse is an exemplary cylindrical barrel switch that is rotatable and depressible.

Referring specifically to FIG. 1, the vehicle 12 includes an audio system 24, a climate system 28, a navigation system 32, and a driver information system 36. In an exemplary embodiment, the audio system includes a radio, tape player, compact disk player, and speakers. In an exemplary embodiment, the climate system 28 includes an air conditioner for providing cooled air, a heater for providing heated air, and ducts and vents for providing the heated or cooled air to the vehicle passenger compartment (not shown). The ducts are configured to selectively provide air to a first set of vents below an instrument panel, to a second set of vents formed inside the instrument panel and positioned to direct air generally rearward, and a third set of vents formed in the instrument panel and positioned to direct air to a windshield for use in defrosting, as understood by those skilled in the art. Each of systems 24, 28, 32, 36 has a plurality of selectively variable system characteristics.

The control system 10 includes a controller 40 operatively connected to the switches 14A-E. The switches 14A-E are configured to generate signals 41 when rotated or depressed. The signals 41 are transmitted to the controller 40, such as by wires, flexible circuit boards, etc. The controller 40 is configured to transmit control signals 42 to the climate control system 28, the audio system 24, the navigation system 32, and the driver information system 36 so that the control system 10 functions as described herein. Systems 24, 28, 32, 36 are responsive to signals. 42 by varying or altering one or more system or component characteristics.

The controller 40 is programmed and configured to provide the control system 10 with four modes of operation. In a first mode of operation, each of switches 14A, 14B, 14D, 14E is manipulable to alter a respective variable characteristic of the audio system. In a second mode of operation, each of switches 14A, 14B, 14D, 14E is manipulable to alter a respective variable characteristic of the climate system. In a third mode of operation, each of switches 14A, 14B, 14D, 14E is manipulable to alter a respective variable characteristic of the navigation system. In a fourth mode of operation, each of switches 14A, 14B, 14D, 14E is manipulable to alter a respective variable characteristic of the driver information system. Switches 14A, 14B, 14D, 14E are thus "characteristic adjustment switches."

In the context of the present invention, manipulation of a switch "enables the variation" or "causes the variation" of a variable characteristic if the manipulation, either by itself or in conjunction with another action, causes a change in the variable characteristic. Thus, for example, and within the scope of the claimed invention, rotation of a switch enables or causes the variation of a variable characteristic if the control system causes the characteristic to change automatically upon the rotation. Similarly, and within the scope of the claimed invention, rotation of a switch enables or causes the variation of a variable characteristic if the control system causes the characteristic to change upon the rotation and an additional input by the driver, such as depressing the switch.

The controller is configured such that rotation of the central switch 14C causes the control system 10 to alternate between the first, second, third, and fourth modes of operation, and thus switch 14C is referred to herein as a "mode selector switch."

The control system 10 also includes a display 44 sufficiently located within the vehicle for viewing by a driver or passenger. Exemplary display 44 locations include the vehicle instrument panel, gage cluster, heads-up display, base of windshield, A-pillar, etc. The controller 40 is configured to transmit signals 46 to the display 44 to control the display 44 so that the display functions as described herein.

The display 44 is configured to selectively depict indicia representing the current state of the control system and variable system characteristics. More specifically, the controller 40 is configured to cause the display 44 to depict a plurality of icons. Each icon is a symbol that is representative of a vehicle component or system,. or representative of a variable characteristic of a vehicle component or system. The icons, which may also be referred to herein as "indicia," may include alphanumeric characters, numbers, graphs, lists, etc., within the scope of the claimed invention.

The display 44 provides information to the driver about the vehicle systems, and provides visual feedback of switch 14A-E manipulation. Four icons 48A-D are depicted on the display 44. Icon 48A represents the audio system 24, icon 48B represents the climate system 28, icon 48C represents the navigational system 32, and icon 48D represents the driver information system 36.

The appearance of icons 48A-D is responsive to rotation of switch 14C to indicate in which of the four modes the control system is operating, or will be operating upon the occurrence of an additional input by the driver, such as the depression of switch 14C.

More specifically, the controller 40 is configured to change the appearance of the icon representing the system that is presently controllable by manipulation of switches 14A, 14B, 14D, 14E. In the embodiment depicted, the icon representing the system selected for control includes a box 52. Those skilled in the art will recognize other means of changing the appearance of an icon that may be employed within the scope of the claimed invention, such as changing the size of the icon, changing the color of the icon, etc.

In FIG. 1, icon 48A includes box 52 to indicate that the control system 10 is in the first mode of operation wherein the manipulation of switches 14A-B and 14D-E enables variation in audio system 24 characteristics. Accordingly, the display 44 depicts a first set of icons 56A-D, each indicating the present status of a respective audio system characteristic, or what the status will be after an additional input by the driver. Icon 56A includes a schematic depiction of a speaker 58 with curvilinear lines 60 adjacent thereto, and represents the speaker volume. Icon 56B includes a line 62 and a bar 64 intersecting, and perpendicular to, the line 62; icon 56B represents audial characteristics of the speakers, which, in FIG. 1, is the bass level. Icon 56C is an alphanumeric representation of the general source from which the audio system is receiving audial content, which, in FIG. 1, is the FM (frequency modulation) band. Icon 56D is an alphanumeric representation of the specific source from which the audio system is receiving audial content, which, in FIG. 1, is the FM frequency to which the radio of the audio system 24 is tuned.

Figures 2, 3:
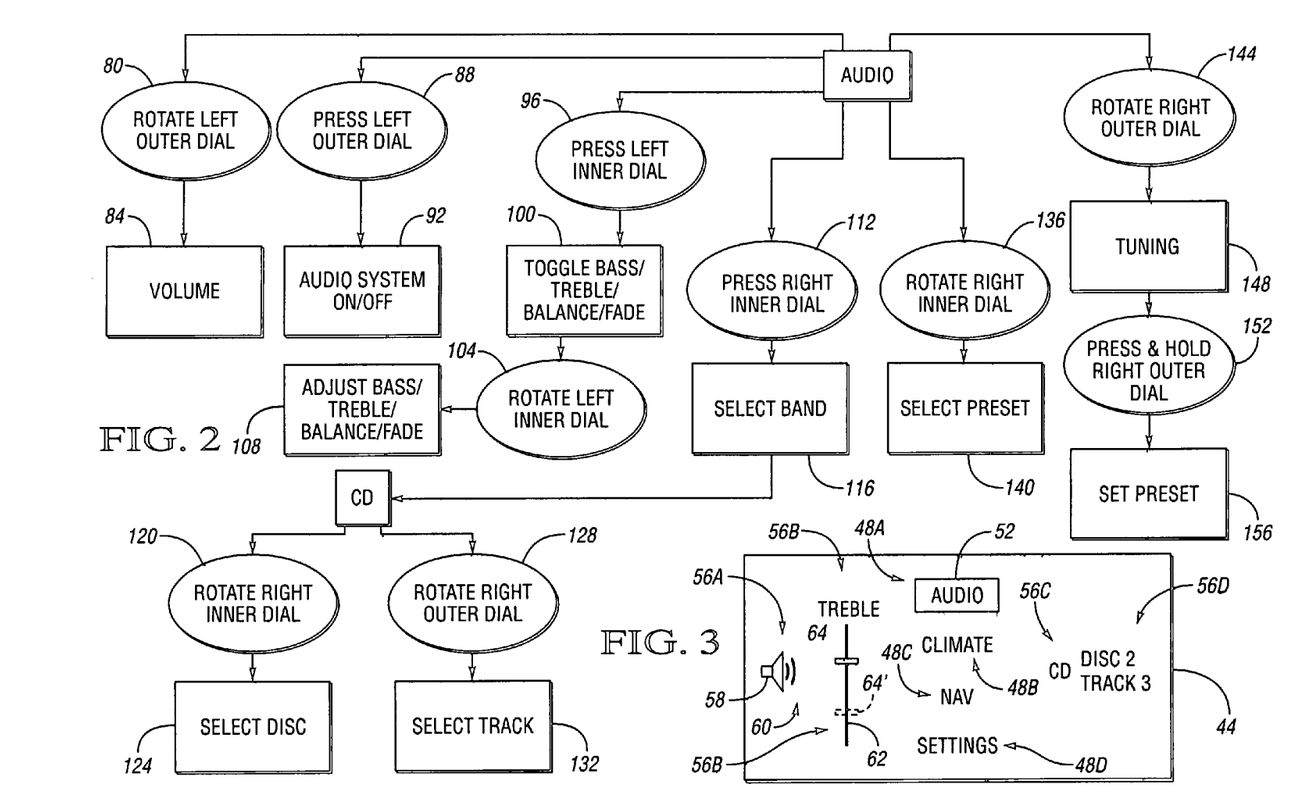
FIG. 2 is a flow diagram depicting an exemplary control program for the control system of FIG. 1 in a first operating mode.
FIG. 3 is a schematic depiction of the display of FIG. 1 in the first operating mode.

FIG. 2 depicts an exemplary audio system control program for the controller 40 when the control system 10 is in the first mode of operation. Referring to FIGS. 1 and 2, rotation of switch 14A (step 80) causes the controller 40 to alter speaker volume (step 84). Rotating switch 14A in one direction will increase speaker volume, and rotating of switch 14A in the other direction will decrease speaker volume. Concurrently with altering speaker volume at step 84, the controller causes a change in the appearance of icon 56A. The quantity of curvilinear lines 60 in icon 56A is indicative of volume level. In FIG. 1, icon 56A includes three curvilinear lines 60. If the rotation of switch 14A at step 80 causes a reduction in volume, then the quantity of lines 60 is reduced, as shown in FIG. 3, wherein icon 56A includes only two lines 60. Similarly, if rotation of switch 14A at step 80 causes an increase in volume, one or more lines 60 are added to icon 56A.

Depressing switch 14A (step 88) causes the controller 40 to alternately turn the audio system 24 on or off (step 92).

Depressing switch 14B at step 96 causes the controller 40 to switch between first, second, third, and fourth submodes of operation at step 100 in which rotating switch 14B causes alteration of the bass level, the treble level, the balance, and the fade, respectively, of the audio system 24. In FIG. 1, icon 56B includes an alphanumeric indicator "BASS" to indicate that the control system is operating in the first submode wherein rotating switch 14B causes a change in the bass level. Depressing switch 14B once causes the display 44 to change the appearance of icon 56B, as shown in FIG. 3. Referring to FIG. 3, icon 56B includes an alphanumeric indicator "TREBLE" to indicate that the control system is operating in the second submode wherein rotating switch 14B causes a change in the treble level.

Similarly, depressing switch 14B when the control system is in the second submode will cause icon 56B to include the text "BALANCE" to indicate the third submode of operation wherein rotating switch 14B causes variation in the balance. Depressing switch 14B when the control system is in the third submode will cause icon 56B to include the text "FADE" to indicate a fourth submode of operation wherein rotating switch 14B causes variation in the fade of the audio system. Those skilled in the art will recognize that "balance" refers to the difference in volume between left and right speakers within the passenger compartment, and that "fade" refers to the difference in volume between front and rear speakers within the passenger compartment.

Accordingly, rotating switch 14B at step 104 causes the controller to adjust one of the bass, treble, balance, and fade at step 108, depending on which of the four submodes is selected at step 96. The controller 40 is configured to alter icon 56B in response to rotation of switch 14B. More specifically, and with reference to FIGS. 1 and 2, when the first submode is selected, rotation of switch 14B in one direction at step 104 causes an increase in bass and a corresponding movement of bar 64 to a new position shown in phantom at 64'. Rotation of switch 14B in the other direction at step 104 causes a decrease in bass and a corresponding movement of bar 64 farther from the "BASS" text portion of icon 56B. Similarly, with reference to FIG. 3, rotation of switch 14B at step 104 in the second submode causes a variation in treble and a corresponding alteration of icon 56B. Thus, if rotation causes a decrease in the treble level, bar 64 will move to a new position such as the one shown in phantom at 64' in FIG. 3.

Referring again to FIGS. 1 and 2, depressing switch 14D at step 112 causes the controller 40 to alter the band or audio source (e.g., a compact disk player) to which the audio system is tuned at step 116. Thus, as shown in FIG. 1, icon 56C shows that the FM band is selected. Pressing switch 14D once will cause the audio system to select the AM band, with a corresponding change to icon 56C. Pressing switch 14D twice will cause the audio system to select the compact disk player, with a corresponding change to icon 56C as shown in FIG. 3. Furthermore, when the compact disk player is selected, icon 56D indicates which disk and track are playing, as shown in FIG. 3.

When the compact disk player is selected at step 112, rotating switch 14D at step 120 causes the controller to alter which of several compact disks stored in the audio system is played at step 124, with a corresponding change to icon 56D in FIG. 3. Further, when the compact disk player is selected at step 112, rotating switch 14E at step 128 causes the controller 40 to alter the compact disk track being played at step 132, with a corresponding change to icon 56D in FIG. 3.

Rotating switch 14D at step 136 causes the controller 40 to alternate between different radio frequencies stored in memory (i.e., "preset" stations) at step 140, with a corresponding change to icon 56D to show the preset station frequency selected.

Rotating switch 14E at step 144 causes the controller to alter the radio frequency to which the audio system is tuned at step 148. More specifically, rotating switch 14E in one direction will increase the frequency to which the audio system is tuned, and rotating switch 14E in the opposite direction will decrease the frequency to which the audio system is tuned. The controller 40 is configured to alter the appearance of icon 56D in response to rotation of switch. 14E at step 144 to indicate the frequency to which the audio system is tuned.

Depressing switch 14E at step 152 will cause the controller 40 to store the frequency indicated by icon 56D as a "preset" station at step 156 for use in steps 136 and 140.

Figures 4, 5:
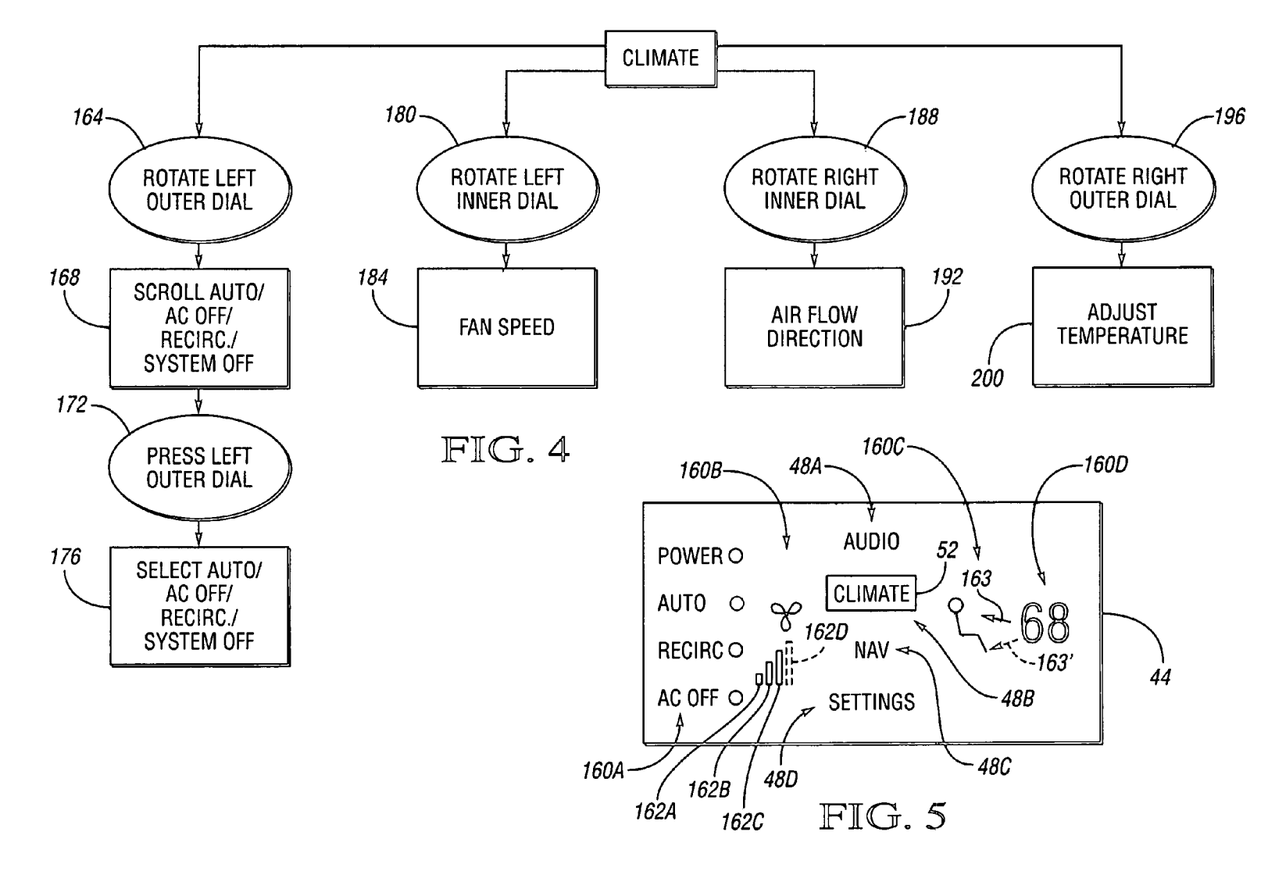
FIG. 4 is a flow diagram depicting an exemplary control program for the control system of FIG. 1 in a second operating mode.
FIG. 5 is a schematic depiction of the display of FIG. 1 in the second operating mode.

When switch 14C is rotated so that the control system is in the second mode of operation, icon 48B includes box 52, and icon 48A does not include a box, as shown in FIG. 5, to indicate that manipulation of switches 14A, 14B, 14D, 14E will alter variable characteristics of the climate system.

Referring to FIG. 4, an exemplary climate system control program is schematically depicted for the controller 40 when the control system 10 is in the second mode of operation. Rotation of switch 14A at step 164 causes variation (step 168) in which of four climate system submodes of operation is selectable at step 172. Depressing switch 14A at step 172 causes the selectable climate system submode to be selected and implemented at step 176. The four submodes include climate system power (i.e., on/off), an automatic setting, an air recirculation setting, and air conditioning power (i.e., on/off).

Rotating switch 14B at step 180 causes variation of the speed of the climate system fan at step 184, and thereby causes variation in the volume and speed of air entering the vehicle passenger compartment via the ducts and vents. More specifically, rotating switch 14B in one direction at step 180 will increase the speed of the fan, and rotating switch 14B in the other direction at step 180 will decrease the speed of the fan.

Rotating switch 14D at step 188 causes variation at step 192 in the air flow mode, that is, the location at which air is injected into the passenger compartment, e.g., adjacent the floor, through vents in the dash panel directed at the passengers, through vents in the dash panel directed at a windshield, etc. Rotating switch 14E at step 196 causes variation in the temperature of air injected into the passenger compartment at step 200.

Referring to FIG. 5, the display 44 depicts a second set of icons 160A-D when the control system is in the second mode of operation. Icons 160A-D indicate the present status of a respective climate system characteristic, or what the status will be after an additional input by the driver.

Referring to FIGS. 4 and 5, icon 160A is a list of the climate system submodes with a corresponding circle adjacent each climate system submode. The controller causes the circle corresponding to the present climate system mode to be filled at step 176. Icon 160B includes a series of bars 162A-C of varying lengths indicating the fan speed. Rotation of switch 14B at step 180 will cause the icon 160B to change to indicate a change in fan speed. For example, rotation of switch 14B in one direction will automatically cause the number of bars to increase to indicate an increase in fan speed. For example, to indicate an increase, bar 162D may be added to icon 160B. Similarly, rotation of switch 14B in the other direction will cause the number of bars to decrease to indicate a decrease in fan speed.

Icon 160C represents the air flow mode of the climate system, and includes a schematic representation of a person and an arrow 163 indicating the vents through which air is flowing into the passenger compartment. Rotation of switch 14D at step 188 causes a corresponding change in the position of the arrow 163 with respect to the person. For example, if rotation of switch 14D at step 188 causes the air flow mode to change such that air flows through vents under an instrument panel, arrow 163 is moved to a new position shown in phantom at 163'.

Icon 160D is a number that represents the temperature (in degrees Fahrenheit) of air injected into the passenger compartment. Rotation of switch 14E at step 196 causes the icon 160D to change to accordingly to indicate air temperature.

Rotation of central switch 14C in one direction will cause the box 52 to move upward on the display from icon 48B to icon 48A to indicate that the control system 10 is or will be in the first mode wherein switches 14A, 14B, 14D, 14E are manipulable to enable variations in audio system characteristics. Rotation of the central switch 14C in the opposite direction will cause the box to move downward on the display to icon 48C to indicate that the control system is in the third mode wherein switches 14A, 14B, 14D, 14E are manipulable to enable variations in navigation system characteristics such as programmed vehicle destination information. Further rotation of the central switch 14C in the opposite direction wall cause the box 52 to move downward on the display to icon 48D to indicate that the driver information center is selected or will be selected upon an additional input, i.e., the fourth mode.

Figure 6:
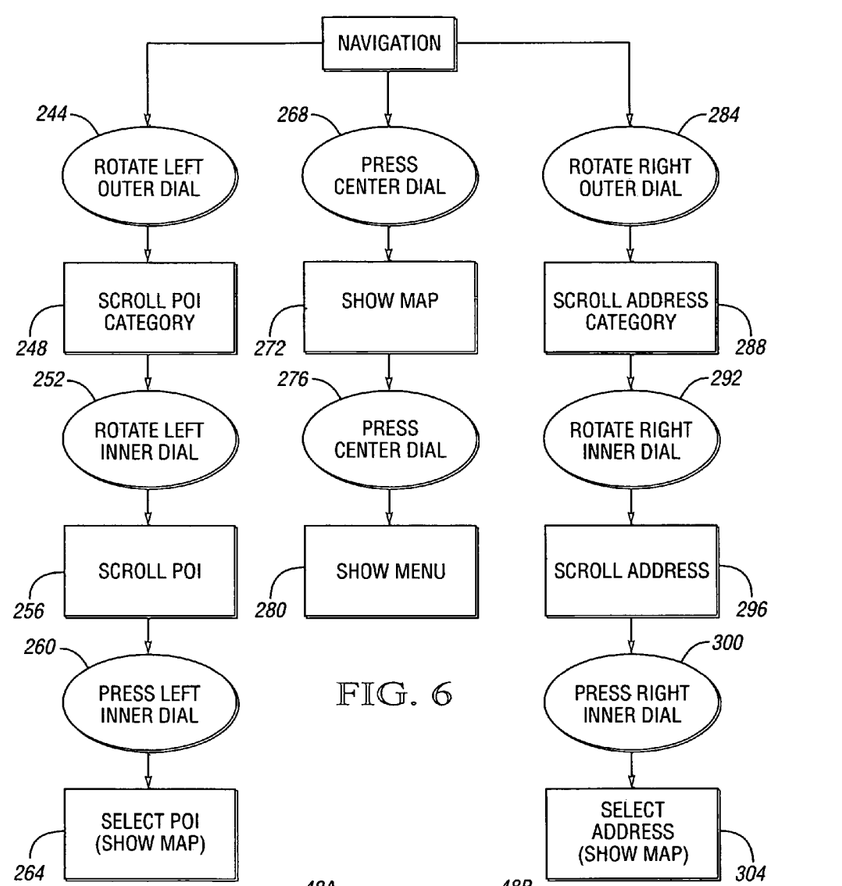
FIG. 6 is a flow diagram depicting an exemplary control program for the control system of FIG. 1 in a third operating mode.
Figure 7:
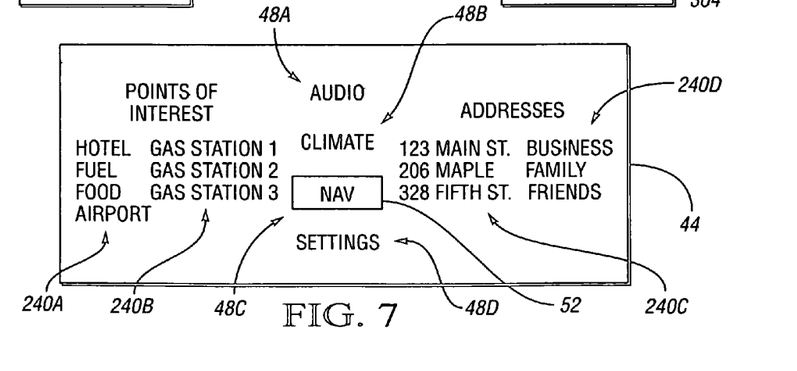
FIG. 7 is a schematic depiction of the display of FIG. 1 in the third operating mode.

Referring to FIGS. 6 and 7, an exemplary navigation system control program is schematically depicted for the controller when the control system is in the third mode of operation. Rotating switch 14A at step 244 causes variation at step 248 in which of four point of interest categories is selected. The display 44 depicts indicia 240A, which is a list of the point of interest categories, namely, hotels, fuel, food, and airports. When one of the categories is selected via rotation of switch 14A at step 244, indicia 240B is a list of points of interest within the category selected at steps 244 and 248. In FIG. 7, the "fuel" category is selected, and indicia 240B is a list of fuel providers. Rotating switch 14B at step 252 causes variation at step 256 in which of the points of interest in list 240B is selectable by depressing switch 14B at step 260. By depressing switch 14B at step 260, a map is shown on the display 44 at step 264 to indicate the location of the point of interest selected at step 260.

Depressing switch 14C causes the display to alternate between displaying a map and displaying the menu shown in FIG. 7. Thus, depressing switch 14C at step 268 causes the map to be displayed at step 272. Depressing switch 14C again at step 276 causes the menu to be displayed at step 280.

Rotating switch 14E at step 284 causes variation at step 288 in which of several address categories is selected. The display 44 depicts indicia 240D, which is a list of the address categories, namely, business, family, and friends. When one of the categories is selected via rotation of switch 14E at step 284, indicia 240C is a list of addresses stored by the navigation system within the category selected at steps 284 and 288. Rotating switch 14D at step 292 causes variation at step 296 in which of the addresses shown in list 240C is selectable by depressing switch 14D at step 300. By depressing switch 14D at step 300, a map is shown on the display 44 at step 304 to indicate the location of the address selected at step 300.

Figure 8:
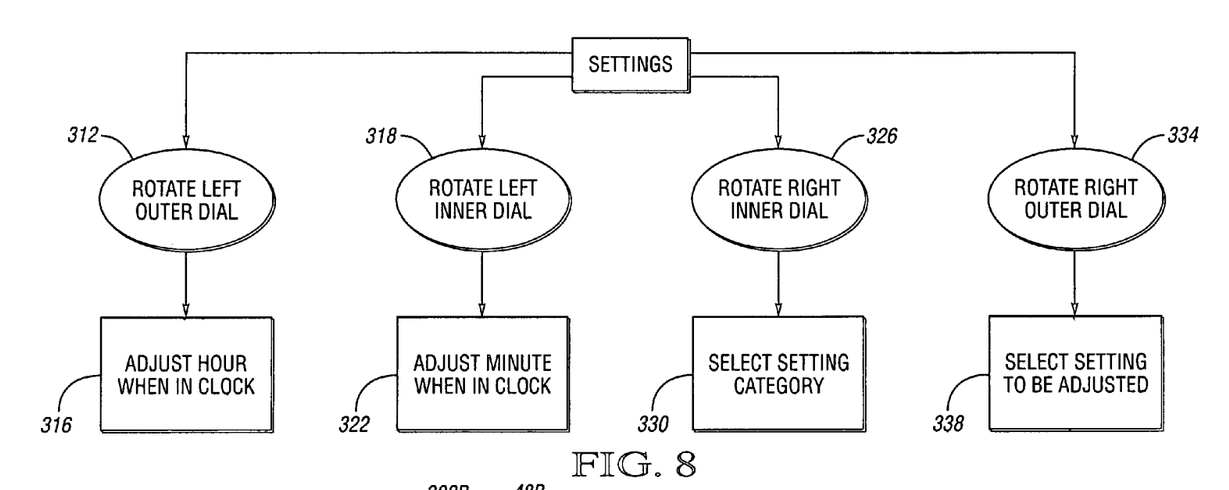
FIG. 8 is a flow diagram depicting an exemplary control program for the control system of FIG. 1 in a fourth operating mode.
Figure 9:
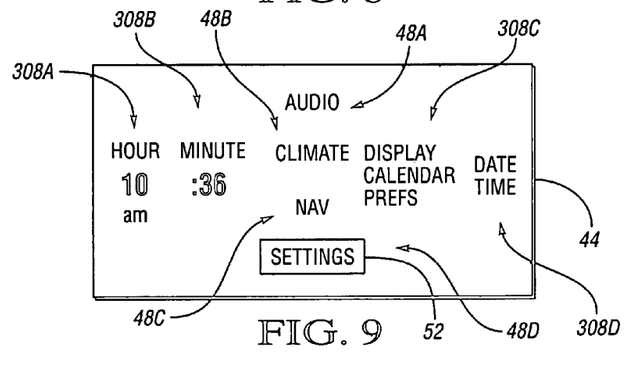
FIG. 9 is a schematic depiction of the display of FIG. 1 in the fourth operating mode.

Referring to FIGS. 8 and 9, an exemplary driver information system control program is schematically depicted for the controller when the control system is in the fourth mode of operation. Rotating switch 14A at step 312 causes variation in the hour for which the clock display is set at step 316. The display 44 depicts icon 308A, which indicates the hour for which the clock display is set, and which changes in response to rotation of switch 14A at step 312. Rotating switch 14B at step 318 alters the minutes for which the clock display is set at step 322. Icon 308B indicates the minutes, and changes in response to rotation of switch 14B at step 318.

Rotating switch 14D at step 326 causes variation at step 330 in which of three settings categories is selected. The display 44 depicts indicia 308C, which is a list of the settings categories, namely, display, calendar, and preferences. Indicia 308D is a list of settings within the category selected at step 330. In a preferred embodiment, when a category or element in a list is "selected," the controller causes the corresponding representation on the display 44 of the category or element to be highlighted, i.e., visually differentiated from the other categories or elements such as by size, color, etc.

Rotating switch 14E at step 334 causes variation at step 338 in which of the settings shown in list 308D is selected for adjustment by the rotation of switches 14A, 14B.

It may be desirable to employ an audio output device to provide audial feedback to the driver. The audio output device would be operatively connected to the controller such that the audio output device generates sounds, such as chimes or beeps, in response to the rotation of the switches 14A-E. Further, in a preferred embodiment, the amount of change in a variable characteristic is proportional to the amount of rotation of the corresponding switch.

While the best modes for carrying out the invention have been described in detail, those familiar with the art to which this invention relates will recognize various alternative designs and embodiments for practicing the invention within the scope of the appended claims.

The invention claimed is:

1. A control system for a vehicle having first and second variable characteristics, the control system comprising:
    a plate defining a surface having at least one hole therein;
    a mode selector switch extending through said at least one hole and being selectively rotatable about an axis that is parallel to the surface;
    a characteristic adjustment switch extending through said at least one hole and being selectively rotatable about an axis that is parallel to the surface;
    a controller operatively connected to the mode selector switch and the characteristic adjustment switch;
    wherein the mode selector switch is selectively manipulable to cause the controller to alternate between first and second modes of operation; and
    a display operatively connected to the controller; wherein the controller is configured to cause the display to depict a first icon in the first mode, and a second icon in the second mode;
    wherein the controller is configured to alter the first variable characteristic in response to manipulation of the characteristic adjustment switch in the first mode; and wherein the controller is configured to alter the second variable characteristic in response to manipulation of the characteristic adjustment switch in the second mode.

2. The control system of claim 1, wherein the characteristic adjustment switch is generally cylindrical and selectively rotatable; and
    wherein the controller is configured to alter the first variable characteristic in response to rotation of the characteristic adjustment switch in the first mode; and
    wherein the controller is configured to alter the second variable characteristic in response to rotation of the characteristic adjustment switch in the second mode.

3. The control system of claim 2, wherein the vehicle is characterized by a third variable characteristic; wherein the characteristic adjustment switch is selectively depressible; wherein the control system is configured such that depressing the characteristic adjustment switch causes the controller to operate in a third mode of operation; and wherein the controller is configured to alter the third variable characteristic in response to rotation of the characteristic adjustment switch in the third mode.

4. The control system of claim 1, wherein the controller is configured to alter the appearance of the first icon in the first mode in response to manipulation of the characteristic adjustment switch; and wherein the controller is configured to alter the appearance of the second icon in the second mode in response to manipulation of the characteristic adjustment switch.

5. A vehicle comprising:
    at least one vehicle system having first and second variable characteristics;
    a plate defining a surface having at least one hole therein;
    a control system including a first barrel switch and a second barrel switch;
    said first barrel switch extending through said at least one hole and being selectively rotatable about an axis that is parallel to the surface;
    said second barrel switch extending through said at least one hole and being selectively rotatable about an axis that is parallel to the surface;
    wherein the control system is sufficiently configured such that rotation of the first barrel switch causes the control system to alternate between a first and second mode of operation;
    wherein the control system is configured such that rotation of the second switch enables variation of the first variable characteristic in the first mode, and rotation of the second switch enables variation of the second characteristic in the second mode.

6. The vehicle of claim 5, wherein the control system further includes a display; and wherein the control system is configured such that the display depicts a first icon representative of the first variable characteristic when the control system is in the first mode, and a second icon representative of the second variable characteristic when the control system is in the second mode.

7. The vehicle of claim 6, wherein the appearances of the first and second icons are responsive to rotation of the second switch.

8. The vehicle of claim 5, wherein said at least one vehicle system has third and fourth variable characteristics; wherein the control system includes a third barrel switch being selectively rotatable; wherein the control system is configured such that rotation of the third switch enables variation of the third variable characteristic in the first mode, and rotation of the third switch enables variation of the fourth variable characteristic in the second mode.

9. The vehicle of claim 8, wherein the control system further includes a display; wherein the control system is configured such that the display depicts a first icon representative of the first variable characteristic and a second icon representative of the third variable characteristic when the control system is in the first mode, and a third icon representative of the second variable characteristic and a fourth icon representative of the fourth variable characteristic when the control system is in the second mode.

10. The vehicle of claim 9, wherein the appearance of the first and third icons is responsive to rotation of the second switch; and wherein the appearance of the second and fourth icons is responsive to rotation of the third switch.

11. The vehicle of claim 8, wherein said first, second, and third barrel switches are rotatable about a common axis.

12. The vehicle of claim 11, wherein said third switch extends through said at least one hole to protrude from said surface.

13. The vehicle of claim 12, wherein said at least one hole includes first, second, and third holes; and wherein said first switch extends through said first hole, said second switch extends through said second hole, and said third switch extends through said third hole.

14. A vehicle comprising:
    at least one vehicle system having first, second, third, and fourth variable characteristics;
    a mode selector switch; a first characteristic adjustment switch and a second characteristic adjustment switch; the mode selector switch and the first and second characteristic adjustment switches being selectively rotatable about a common axis;
    wherein the control system is sufficiently configured such that rotation of the mode selector switch causes the control system to alternate between a first and second mode of operation;
    wherein the control system is configured such that, in the first mode, rotation of the first characteristic adjustment switch causes variation of the first variable characteristic and rotation of the second characteristic adjustment switch causes variation of the second variable characteristic; and wherein, in the second mode, rotation of the first characteristic adjustment switch causes variation of the third variable characteristic and rotation of the second characteristic adjustment switch causes variation of the fourth variable characteristic.

15. The vehicle of claim 14, further comprising a member defining at least one hole and a surface; and wherein said mode selector switch and said first and second characteristic adjustment switches extend through said at least one hole to protrude from said surface.

* * * * *